May 12, 1959 W. B. ZELINA 2,886,763
UNIDIRECTIONAL VOLTAGE REGULATING NETWORK FOR GENERATORS
Filed April 19, 1956
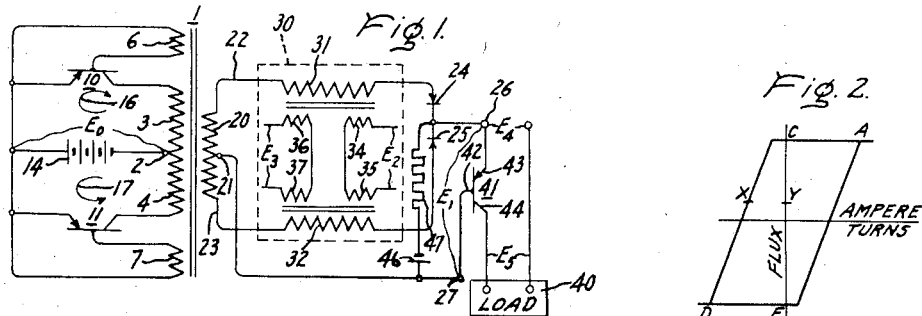
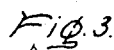
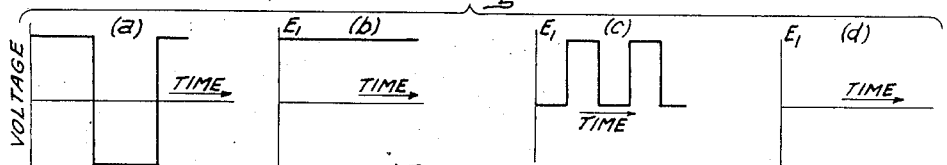
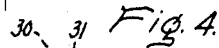
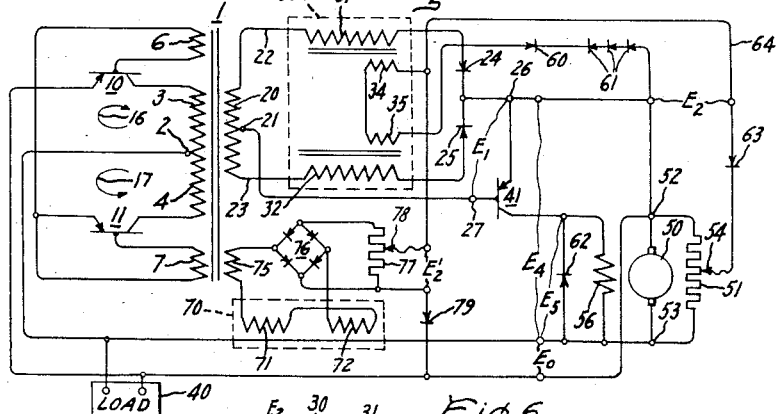
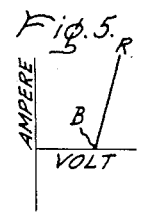
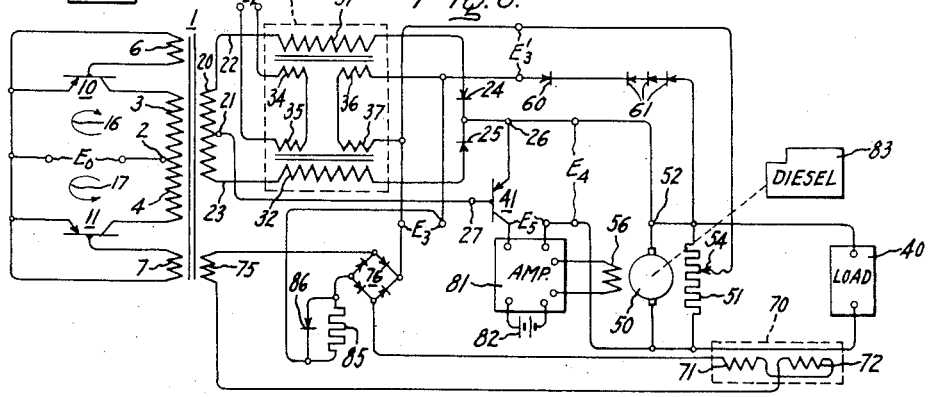
Inventor:
William B. Zelina,
by David P. Ogle
His Attorney.

United States Patent Office 2,886,763
Patented May 12, 1959

2,886,763

UNIDIRECTIONAL VOLTAGE REGULATING NETWORK FOR GENERATORS

William B. Zelina, Erie, Pa., assignor to General Electric Company, a corporation of New York Application April 19, 1956, Serial No. 579,193

20 Claims. (Cl. 322—25)

My invention relates to a unidirectional voltage regulating network, more particularly to a network delivering an output signal regulated by a plurality of input signals and having sufficient power to regulate directly a load device.

This invention is an improvement over my co-pending application, Serial Number 505,715, filed May 3, 1955, and assigned to the assignee of the present application.

For many years the diesel electric locomotive industry and other industries utilizing electric drives have been trying to develop a more reliable control system with a requirement of a minimum of maintenance. It has been found that rotating machinery in control systems may reduce liability and increase maintenance costs. A control network free of any moving parts would find ready application in control voltage regulators for field windings, unidirectional dynamoelectric machine servo networks, and in any other apparatus which requires an amplifier having unidirectional input signals and a unidirectional output signal. Attempts to provide a unidirectional regulating network in the past have resulted either in complicated regulating circuits using vacuum tubes which are fragile and require a separate source of unidirectional voltage or in using various types of rotating machinery which are expensive, inherently inaccurate and often result in excessive hunting or objectionable slowness because of inertia of the moving parts. Such deficiencies cause these networks to be non-competitive with present systems.

In locomotive control systems the regulating network must sense the operation of the operative components to limit the generator voltage and thus protect the generator field windings and prevent dielectric breakdown of the insulation of the entire traction system; to limit generator current to protect the generator armature and the other circuit components; and to limit the power output of the generator to prevent stalling of prime mover which is usually a diesel engine. Basically, the voltage and current output of the generator are dependent on the load conditions and independent of each other. In other words, at low speeds the traction motor resistance is very low and current tends to be high, while at high speeds, the resistance of the traction motors is high and current is lower. When the train is accelerating, current must be limited. On the other hand, when the train is coasting or maintaining its speed under light loads, voltage must be limited. In contrast, the horsepower load of the prime mover is dependent on both the current and voltage output of the generator. Thus, a complete regulating network must sense and evaluate several conditions of operation.

Also, in the past, regulating networks have provided a low power signal which required considerable power amplification, as by an exciter, prior to its being applied to a main field winding of a generator of a locomotive adapted to provide a thousand or more horsepower in traction effort.

Therefore, an object of my invention is to provide a simple and inexpensive unidirectional regulating network capable of developing a composite signal of considerable power capacity.

A further object of my invention is to provide a unidirectional amplifying network in which a plurality of signals or input stimuli will cooperate to provide an output signal of considerable power capacity.

Another object of my invention is to provide a simple, inexpensive and reliable unidirectional high power regulating network free of moving parts wherein unidirectional voltages combine to provide a composite signal of sufficient power capacity to control the excitation of a winding in a dynamoelectric machine.

A still further object is a simple, inexpensive and reliable control network for regulating the voltage and current of a dynamoelectric machine.

In carrying out my invention in one form when used as an amplifier, a self-excited high frequency relaxation oscillator having its feedback path completed through a mutual coupling of the windings on a saturable transformer produces a rectangular alternating output voltage signal which is then rectified and applied to a saturable reactor. The effective impedance of the reactor is controlled by a unidirectional input signal to modulate the percent of the output voltage signal which passes through reactor. The output voltage is then used to energize an electronic switching device to intermittently connect a power source to a load device. When used as a voltage and/or current regulator in a dynamoelectric machine, the input signal is varied in a predetermined manner and the output signal of this network is applied to energize a field winding in a manner determinable by the product of the input signal and the power source voltage.

Further objects and advantages of my invention become apparent and my invention will be better understood from the following detailed description with reference to the accompanying drawings. The features of novelty which characterize my invention will be pointed out with particularity in the claims annexed to and forming part of this specification.

In the drawings,

Fig. 1 is a schematic circuit showing one embodiment of my invention;

Fig. 2 shows a curve illustrating the hysteresis characteristics of the saturable elements of my invention;

Fig. 3($a$–$d$) shows the wave shapes produced in the circuit of the relaxation oscillator shown in Fig. 1;

Fig. 4 is a modification of the circuit shown in Fig. 1 and is adapted for use in a regulating system for a dynamoelectric machine;

Fig. 5 shows the operating characteristics of a diode operated in the Zener breakdown region; and Fig. 6 is a modification of the circuit shown in Fig. 4.

Referring now to the drawings, in Fig. 1, I have shown a saturable transformer 1 having a primary winding provided with a center tap 2 which divides the winding into two equal primary winding portions 3 and 4. On the same core, I have connected similar tertiary windings 6 and 7 each having a number of turns sufficient, with the flux excursions contemplated, to provide a relatively low switching voltage. Two similar p-n-p junction transistors 10 and 11 have their base electrodes and their emitter electrodes connected in circuit with these windings 6 and 7 to be energized by these switching voltages in a sense that will promote conduction between the emitter and collector electrodes of the transistors 10 and 11 alternately. Thus, these transistors are connected as electronic switches.

In order to provide a current source to cause flux excursion in the saturable transformer 1, I have connected the battery 14 having a voltage $E_0$ between the center tap 2 and the emitter electrodes of the transistors 10 and 11. The components of this oscillator circuit are preferably identical so that the output waves caused by the flux excursions in the transformer will provide a symmetric signal as well as a signal having substantially no unidirectional components because of the fact that the total flux excursion between positive and negative saturation is the same as the flux excursion between negative and positive saturation.

Oscillator operation

Assuming the component parts of the relaxation oscillator are substantially identical with inherent or residual characteristics to promote current flow in the transistor 10 when voltage is applied from the battery 14, it is apparent that current will start to flow through the transistor. In order to promote this operation, when current is flowing in the transistor 10 and the winding portion 3, I have connected the winding 6 to the transistor 10 to provide a signal to enhance current flow therethrough and the winding 7 to provide a signal to create a barrier layer in and thus inhibit current flow in the transistor 11. So long as the flux excursion of the transformer 1 is changing, the transistors 10 and 11 act as switches which are alternately turned "On" or "Off" by the voltages induced in the tertiary windings 6 and 7. These transistors alternately connect the unidirectional supply voltage $E_0$ to first allow current flow in loop 16 positively magnetizing the transformer core, and, after positive saturation is reached in the core, in loop 17 in a direction to negatively magnetize the transformer core.

In order to explain the switching action and the flux excursion of the transformer core, I have shown in Fig. 2 the hysteresis loop of the transformer wherein the axis of abscissas is the ampere turns scale and the axis of ordinates is the flux excursion scale. When the unidirectional voltage $E_0$ is applied to the loop circuits 16 and 17 and the network conditions predominately favor the initiation of conduction in the transistor 10, current will flow through the transistor 10 and the winding 3 to initiate positive flux excursion in the transformer 1, to induce a voltage in the tertiary winding 6 to provide a potential between the base and emitter electrodes of the transistor 10 which will further reduce the impedance thereof. I prefer to use circuit components providing impedance characteristics in the loop 16 which are primarily inductive, so that the ampere turns in the transformer will be increasing continually and at a constant rate. Thus, the induced voltages will be a constant voltage during each half cycle. The increasing current of the loop 16 will soon drive the flux excursion of the core to a saturation limb AC at which time further flux excursion can not occur because of the saturation.

When saturation is reached in a rectangular hysteresis core material, the induced voltages in the tertiary windings 6 and 7 collapse almost instantly. For an instant, both transistors 10 and 11 return to their unbiased state with no potential being applied between their emitter and base electrodes. The flux in the transformer drifts along the saturation limb A to the point C which is effectively the residual magnetism of the core after having been saturated in the positive direction. This drift, which occurs in less than a micro-second, constitutes a sufficient negative rate of change in the flux, because of the slight slope of the saturation line A—C, to reverse all of the polarities of the induced voltages of the windings on the core of the transformer 1. This reversal of voltage in the windings 6 and 7 creates a barrier layer between the base and emitter electrodes which turns off the transistor 10, and at the same time, removes the barrier layer of the transistor 11 to enhance conduction therein. As soon as the impedance of the transistor 11 is reduced, current from the voltage $E_0$ flows through the loop 17 including the transistor 11 and the primary winding portion 4, whereby the flux of the transformer 1 is driven through the portion of the curve between points C and D until negative saturation limb DE is reached where continued flux excursion ceases, the flux of the transformer 1 drifts to point E, the switching voltage induced in the winding 7 collapses, the transistor 11 has its impedance increased, and the cycle is repeated. This results in induced voltages in the windings 6 and 7 having a rectangular wave shape similar to that shown in Fig. 3a. It should be noted that since the total flux excursion is a constant depending on the physical properties of the transformer 1 and the rate of the flux excursion depends on $E_0$, the frequency is directly proportional to the voltage $E_0$ and the integrated or average voltage of the transformer windings including winding 20 is equal to zero.

Secondary network

A secondary winding 20 is wound on the core of the transformer 1 to be energized by this flux excursion and, therefore, has induced therein a voltage having a rectangular wave shape shown in Fig. 3a. In my invention, I have provided a center tap 21 on the winding 20 and a full wave rectifier circuit connected to the ends 22 and 23 of the winding 20 shown as the rectifiers 24 and 25. A terminal 26 connected between the rectifiers 24 and 25 and a terminal 27 connected to the center tap 21 provide a unidirectional voltage $E_1$ having substantially no fluctuations or ripple as shown in Fig. 3b. If the turns ratio of the primary winding and the secondary winding is 1:1 so that the voltages between the center taps of the two windings and the end connections thereof are equal, the peak half cycle values of the voltage in the secondary winding portions and the voltage $E_1$ between the terminals 26 and 27 each are equal to $E_0$ and Fig. 3b shows a true curve of $E_0$.

Magnetic amplifier

Referring again to Fig. 1, I have shown a self-saturating magnetic amplifier 30 provided with winding means shown as the similar load current windings 31 and 32 having a sufficient number of turns to saturate the magnetic amplifier 30 with the current contemplated from the secondary winding 20. In order to prevent any current flow during the half cycles which would reduce the flux level of the amplifier 30, the windings 31 and 32 are connected in circuit with the rectifiers 24 and 25. I have also shown wound on the self-saturating magnetic amplifier 30 similar direct current saturating reference windings 34 and 35 which are energized by a unidirectional current signal having a polarity which will drive the magnetic amplifier into the unsaturated region and thus increase the impedance of windings 31 and 32. Such a magnetic amplifier is well known in the art and the particular form or detail of its construction is not a portion of this invention. One such magnetic amplifier is explained in detail in my copending application, Serial Number 468,211, filed November 12, 1954, and assigned to the assignee of this application.

It may also be desirable to place control windings 36 and 37 on the core of the magnetic amplifier 30. One use of these windings will be explained in detail below. For the purposes of this part of the discussion, I assume that the windings 36 and 37 are not energized and do not affect the saturation of the amplifier 30.

The impedance of the magnetic amplifier 30 may be explained from the theory of operation of a square hysteresis loop (Fig. 2). If no signal is applied to the windings 34 and 35, energization of the windings 31 and 32 by the unidirectional half cycles of the output voltage of the oscillator maintains the flux excursion of the amplifier 30 in the saturation region between C and A. The rectifiers 24 and 25 prevent current flow in a negative or unsaturating direction in the windings 31 and 32. Under these conditions, substantially no excitation current is needed to maintain saturation. Applying a unidirectional current signal to the windings 34 and 35 to provide XY ampere turns (Fig. 2), in a sense which will drive the flux density of the magnetic amplifier from the point C toward the point D, will reset this flux at X during the non-conductive half-cycle of each leg of the windings 31 and 32 respectively.

It is readily apparent that the windings 31 and 32 must now provide sufficient volt-seconds to carry the flux excursion back to the saturation point A during the first portion of each conducting half-cycle. Since only a very small exciting current flows in the windings 31 and 32 while the magnetic reactor core of the amplifier 30 is undergoing a flux change, the time in each half-cycle when the magnetic amplifier 30 reaches saturation and again acts like a low impedance shunt can be controlled by varying the unidirectional current in the control windings 34 and 35 to thus vary the setting or degree of unsaturation of the magnetic amplifier 30. Under these conditions, the output characteristic of the voltage $E_1$ across the terminals 26 and 27 appears as a unidirectional rectangular wave (Fig. 3c) where a flux change equal to XA has occurred during the first portion of each conducting half cycle to remove a first portion of each half-cycle.

A properly designed magnetic amplifier will require volt-seconds equal to the oscillator supply signal to change the core flux through the entire excursion. It follows that less than this total available volt-seconds should be absorbed from the control windings 34 and 35 by the magnetic amplifier 30 to obtain a net reset level of X. Following the same reasoning it can be seen that the magnetic amplifier 30 can block substantially all the alternating current of the output voltage signal of the oscillator if the excitation control current of the windings 34 and 35 carries the flux excursion of the magnetic amplifier to the negative saturation limb (point D). The resulting zero output voltage $E_1$ is shown in the curve of Fig. 3d.

In order to provide a pulse width proportional to a control signal, I provide a constant reference voltage $E_2$ just great enough to carry the flux from A to D (Fig. 2) during each half-cycle and apply a control signal voltage $E_3$ to energize the windings 36 and 37 in a sense which will partially counteract the effect of $E_2$. Obviously, we will obtain now a voltage $E_1$ that, again, has the wave shape shown in 3c. However, variation in $E_3$ is directly proportional to the pulse width as shown in 3c while the above discussion of $E_2$ shows it to be proportional to the "valley" width. Thus, the combination of a rectangular wave oscillator and the unidirectional control windings 36 and 37 of the self-saturating magnetic amplifier produce a unidirectional voltage pulse supply, with the width of the valley being controlled by the net ampere turns required to resaturate the self-saturating magnetic amplifier 30 and being proportional to $E_2-E_3$ and the pulse width being controlled by and proportional to $E_3$. Again, the pulse width may be varied between zero and infinity corresponding to the turned-off state where the control signal $E_2$ drives the magnetic flux to the opposite saturation and the turned-on state of the self-saturating magnetic amplifier where the unidirectional signal $E_3$ is great enough to prevent the flux excursion from leaving the region of the saturation limb AC.

*Electronic power switch*

Referring again to Fig. 1 where I have provided an electronic switching means to utilize this voltage pulse supply to connect intermittently a usable power supply voltage $E_4$ to a load 40 such as a field winding or other control device. The particular means I have shown is a power transistor 41 having a base electrode 42 connected to the terminal 27 and an emitter electrode 43 connected to the terminal 26. Each positive pulse of the voltage $E_1$ produced between the terminals 26 and 27 is connected to the base and emitter electrodes of the transistor 41 in a sense which will remove the barrier layer thereof and enhance load current flow from the power voltage $E_4$ through the emitter electrode 43 and a collector electrode 44 to the load 40. The circuit parameters are selected so that the impedance of the power transistor 41 will be very low during the duration of the pulse width and the high during the duration of the valley width as shown in Fig. 3c.

With some electronic switching devices it may be necessary to provide a small bias voltage to ensure the turning "off" of the transistor 41 in Fig. 1. Such a voltage may be provided by a voltage source or battery 46 in series with a large resistor 47 which is connected in parallel with the base and emitter electrodes of the transistor 41 to provide a negative bias between terminals 26 and 27 when the voltage $E_1$ drops to zero.

Therefore, the power transistor 41 is operated in the "On" or "Off" state, both of which are low power dissipating conditions and minimum losses are incurred in the power circuit of this regulator. Since power losses are equal to the square of the current times the impedance, in this case of the power transistor 41, the low power losses are relatively easily explained by the fact that when impedance is high, substantially no current is flowing, and when current is flowing, the impedance is very low.

Of course, other electronic switching devices have been and are being developed which will provide similar characteristics to that of the transistor 41. One of these devices, the lumister, is a stereotronic device which might be used in this switching operation in some applications. The lumister has a phosphorescent control element which controls, with a very small signal current, the impedance of an adjacent photoelectric element between less than one ohm and infinity. It should also be noted that an ignitron or a thyratron type device might provide a similar switching action with proper provisions being made to periodically terminate its conductance at a frequency corresponding to two times the oscillator frequency. An ignitron control is not shown but can easily be envisioned as a differentiating trigger pulse derived from a capacitor connection across another secondary winding of the transformer 1 or a peaking transformer designed to saturate at the beginning of each half cycle.

With this regulating device, an average voltage $E_5$ delivered to the load is equal to the power supply voltage $E_4$ multiplied by the pulse width times twice the frequency of the oscillator. However, for this discussion we will consider the voltage $E_0$ a constant which will fix the frequency and the peak values of voltage $E_1$ as constants.

By proper design of the magnetic amplifier, it is a relatively simple matter to provide the voltage signal $E_2$ which will control saturation so that a very small signal voltage $E_3$ will provide a small trigger pulse $E_1$ across the terminals 26 and 27. The power received by the load is a function of an average voltage $E_5$ received by the load which is equal to $E_4$ multiplied by the pulse width, and I may show $E_5$ as a function of $E_3$ and $E_4$ as follows:

(1) $$E_5 = KE_3E_4$$

Thus, I have developed a unidirectional voltage multiplier which will provide a high power output.

It should be kept in mind that any increase of $E_0$ will increase both the height of $E_1$ which will reduce the pulse width and frequency of the oscillator which will reduce the time during which $E_2$ is effective to increase the valley width. Therefore, the voltage $E_0$ may be varied within the limits of the oscillator operation without destroying the relation of Equation 1 so long as $E_2$ and $E_3$, are so chosen that $E_3$ will vary the pulse width of $E_1$ over the desired range to provide the necessary variation in $E_5$ for the particular operation contemplated.

Of course, the voltage regulating unidirectional high performance amplifier of my invention has many applications in control circuits, computers, and similar apparatus.

*Voltage regulator*

One such application is described herewith and shown in Fig. 4. In this portion of the discussion, the voltage regulator depicted utilizes the output voltage and current characteristics of a unidirectional generator 50 to modulate the field strength of the generator 50. Of course, the generator 50 could be an alternator or other type of dynamoelectric machine. In order to simplify discussion of Fig. 4, I have used similar symbols to represent parts similar to those shown in Fig. 1.

The voltage $E_0$ (the output voltage of the generator 50) energizes the rectangular wave relaxation oscillator of my invention. Of course, if the residual voltage of the generator 50 is so low that it will not switch on the transistor 41, it may be necessary to boost the voltage $E_0$ with a battery trickle excitation in field winding 56 or by some other well known means.

A variable divider 51 for a voltage limit adjustment voltage control is connected across the load terminals 52 and 53 of the generator 50. The voltage $E_2$ is supplied from between the terminal 52 and a voltage tap 54 of the divider 51 to control the excitation of the windings 34 and 35 of the saturating magnetic amplifier 30 and thus act as a valley width modifier discussed above. A field winding 56 is connected to provide the excitation of the generator 50.

In order to control the magnitude of output voltage at which a valley width modulator voltage $E_2$ will remove a portion of the signal voltage $E_4$ from the controlled load, in this case the field winding 56 of the generator 50, I have connected a constant voltage reference silicon diode 60 adapted to be operated in the region of its Zener (reverse current) breakdown voltage, in series with the control field windings 34 and 35. The advantage of operating in the Zener region of the diode 60 is that the reverse impedance is a constant low value after the voltage $E_2$ is sufficient to cause initial current flow.

This may be clearly seen from the volt ampere characteristics shown in Fig. 5 where the axis of abscissas is the volt scale and the axis of ordinates is the ampere scale. At the breakdown voltage B, the diode starts to conduct. Thus, I am able to provide a voltage limit impedance which will prevent current flow prior to a predetermined voltage B. As voltage increases, current increases as shown by the breakdown resistance line BR.

However, the breakdown voltage B is subject to temperature variation considerations. In order to prevent temperature variation from affecting the breakdown voltage B, I have connected in series therewith germanium or silicon diodes 61, which, when carrying current in the forward direction have an impedance which varies thermally in a manner to cancel out any thermal variation in the diode 60. The setting of the voltage tap 54 predetermines the value at which the generator voltage will be sufficient to cause current flow through the diode 60 into the field windings 34 and 35 of the magnetic amplifier 30.

This current will reduce the saturation of the self-saturated magnetic amplifier 30 so that the load transistor 41 is no longer continually biased to carry current of the voltage $E_4$ (in this case the generator voltage) to the field winding 56. Since the current supplied to the field winding 56 now is intermittent, the average voltage $E_5$ at the field winding is less than the voltage $E_4$. I prefer that the number of turns in the windings 34 and 35 are sufficient to control the pulse width of the voltage $E_1$ accurately and hold the output voltage of the generator 50 at a predetermined value.

However, the operation of a dynamoelectric machine field winding similar to the field winding 56 on a rectangular or intermittent voltage (Fig. 3c) is impracticable because of the high inductive properties of the field winding which resist abrupt current changes. Therefore, I have provided a shunting circuit for the field winding 56 which allows the field to collapse at a rate which will not produce unwanted transients or excessive voltages across the transistor 41.

In order that this shunt does not bypass the desirable field energizing voltage $E_4$, I have inserted therein a rectifier 62. The function of this rectifier 62 across the generator field winding 56 is to commutate the current flow. The shunt path through one way impedance of the rectifier 62 and the generator field inductance cooperate to maintain the field current at a constant integrated value. I prefer that the frequency of the oscillator be relatively high and that the inductance of the field winding 56 be high also to prevent substantial field voltage fluctuation for the chosen frequency of the oscillator. With this design, the ripple content of the field current has a maximum value dictated by the henry to ohm ratio of winding 56 and the frequency of the oscillator. Thus, the inductance of the field winding 56 is used as a smoothing choke and the field current will decay exponentially during the valley width. By proper selection of the parameters of the oscillator, it is a simple matter to provide a frequency; for instance, a hundred cycles per second, which is high enough with respect to the henry to ohm ratio to limit the ripple to a very small value.

A rectifier 63 is provided to prevent the reversal of current flow in the energizing circuit between the voltage $E_2$ and the reactor control windings 34 and 35 through a wire 64 so that even if the generator output voltage were reversed, the voltage $E_2$ could not cause an increase in the saturation of the amplifier 30.

Thus, it is readily seen that I have provided a simple, reliable, accurate and low power voltage regulation system for this unidirectional generator 50.

*Current regulator*

In some applications, it is desirable also to limit the current output of the generator 50. In Fig. 4, I have shown a current limit control cooperating with the voltage control regulator.

A unidirectional current measuring reactor 70 is connected to cooperate with the load line from the terminal 53 of the generator 50 to derive a voltage $E'_2$ proportional to the generator load amperes. Physically the measuring reactor 70 consists of two cores having wound thereon multiturn alternating current windings 71 and 72. These cores are placed, with respect to the load line 53, so that a single turn winding of the direct current load amperes passes therethrough. The direct current windings are designed to saturate the current measuring reactor core at a very low percentage of the rated load current. The alternating current windings 71 and 72 are energized in a sense to further saturate one core and to unsaturate the other core. As the load current increases, less of the alternating half cycle current, driving the cores into the unsaturated region, is effective in unsaturating the cores. Thus, the impedance of the alternating current windings will be reduced as the load current increases.

In my invention, the rectangular wave oscillator provides a ready source of supply voltage for the alternating current windings of the current measuring reactor. The alternating rectangular wave is provided by a secondary winding 75 which is connected to the alternating current windings 71 and 72 of the reactor 70 and through a bridge rectifier 76. Therefore, as the load current increases, the reactor impedance decreases and the current in the bridge rectifier 76 is increased. In order to utilize any signal detected by the reactor 70, the unidirectional diagonal terminals of the bridge rectifier 76 have connected thereacross a current limit adjustment voltage divider 77 provided with a voltage tap 78.

One terminal of this voltage divider 77 is connected through a rectifier 79 to the voltage terminal 52 of the generator 50. In order to energize the control windings 34 and 35, the variable current limit adjustment voltage divider 77 is connected in parallel with the voltage adjustment voltage divider 51 by having its voltage tap 78 connected to one side of the control windings 34 and 35. As the load current from the generator 50 increases above a predetermined amount, the voltage output of the bridge rectifier 76 is increased proportionally. This voltage is rectified in the bridge rectifier 76 to cause a voltage drop in the divider 77 which will thus provide the voltage $E'_2$ to modify the impedance of the self-saturating magnetic amplifier 30. The voltage $E'_2$ between the voltage tap 78 and the diode 79 is proportional to the generator load current. When $E'_2$ exceeds the breakdown voltage of the Zener diode 60, a signal is provided in the valley width modulator windings 34 and 35 to reduce the field current of the generator 50 and thus limit the generator output current. It is apparent then that the control circuit of my invention will regulate the generator 50 to maintain a constant voltage until a predetermined current value is reached after which a constant current is maintained.

*Horsepower limit*

In the following discussion, in order to provide a useful signal proportional to the horsepower or wattage, or, in other words, the output voltage multiplied by the output current of the generator 50, I prefer to use a differential arrangement which reduces generator excitation when a predetermined signal is reached by the product of the current and voltage. Of course, this requires a reference signal which will provide a maximum excitation level to be reduced or bucked down by the differential signal. Because of the high voltages involved and the resulting high power losses of a differential winding in a generator, it may be uneconomical to use this arrangement.

However, a separate exciter device readily lends itself to this application and is indicated at 81 in Fig. 6. One such exciter is the amplidyne, but in some applications it might be preferable to use another type of multiwinding exciter or a magnetic amplifier.

In Fig. 6 the reference windings 34 and 35 are energized from a constant voltage $E_2$ to provide a flux excursion in the magnetic amplifier 30 from A to D (Fig. 2) during each non-conductive half-cycle. The current signal voltage $E_3$ is now applied to the pulse width modulating windings 36 and 37 in a sense to partially counteract the effect of the windings 34 and 35. The generator terminal voltage $E_4$ is applied across the circuit of the transistor 41. This results in a composite signal $E_5$ being proportional to $E_3E_4$.

The amplifier 81 is energized by this composite differential signal $E_5$ and a reference signal from a source such as a battery 82. The reference signal causes the amplifier 81 to excite the field winding 56 in a sense to provide the output voltage $E_4$. The differential composite signal $E_5$ is connected to the amplifier 81 in a sense which reduces the excitation of the winding 56 in proportion to the load current signal $E_3$ and the terminal voltage $E_4$. Thus, it is readily seen that the excitation of the winding 56 is reduced proportional to the wattage (load current times terminal voltage) of the generator 50. This control network may be adjusted to a maximum value just low enough to prevent stalling of a prime mover having a limited power output such as a diesel engine 83. Also, this horsepower limit may provide control of a specific load such as a welding arc to thus regulate the power dissipated per unit time.

Simply providing a horsepower limit will result in a machine that may have excessive voltage or current under certain load conditions. With the circuit shown in Fig. 6, it is also feasible to control the maximum voltage output of the generator by connecting the components 51, 60 and 61 to the control windings 36 and 37 to provide a control voltage $E'_3$ when the voltage output of the generator 50 reaches a predetermined value. The operation of this portion of the circuit is similar to that discussed in connection with the voltage limit (Fig. 4), with the exception of the fact that $E'_3$ now modulates the pulse width to increase a differential signal while $E_2$ modulated the valley width to decrease main signal.

In order to limit the maximum current of the generator, I have added, in series with the signal $E_3$, a resistor 85 and another voltage limit device shown as the Zener diode 86. As the signal $E_3$ increases to increase the IR voltage drop across the resistor 85, the IR drop increases until the voltage across the Zener diode 86 reaches the reverse breakdown voltage, at which time the resistance of the composite impedance (85 and 86) is reduced and the current in the control windings starts to increase rapidly with any increase in load current signal, thus increasing the signal $E_5$ and reducing the excitation of the field winding 56 to prevent further load current increase.

While I have shown and described particular embodiments of my invention, further modifications thereof may occur to those skilled in the art without departing from the true spirit of my invention. For instance, it is obvious that the field winding 56 (Fig. 4) could be a main winding of a dynamoelectric machine or a winding of an exciter machine. It is also obvious that the control system may be regulated as a function of speed or the control function of a particular load with other servo connections not shown. Also $E_2$, $E'_2$, $E_3$ or $E'_3$ may be supplied from a device other than the load being controlled. I intend, therefore, by the appended claims to cover all such modifications as fall within the true spirit and scope of my invention.

What I claim as new and desire to secure by Letters Patent of the United States is:

1. A control network for actuating a switching device, comprising a rectangular wave oscillator having an alternating output voltage signal, a self-saturating reactor having winding means connected to receive unidirectional half cycles of the output signal of said oscillators, means for reducing the flux density of said reactor below the saturation level during non-conductive periods of said winding means, and electrical circuit means for connecting the switching device to said winding means.

2. A control network for actuating a switching device, comprising a rectangular wave oscillator having an alternating output voltage signal, a self-saturating reactor having windings each connected to receive alternate unidirectional half cycles of the output signal of said oscillator, control means for reducing the flux density of said reactor below the saturation level during the half cycle of said output voltage signal when said windings are non-conductive, and electrical circuit means for connecting the switching device to said windings.

3. A control network for actuating an electronic switching device, comprising a rectangular wave oscillator having an alternating output voltage signal, a self-saturating reactor having winding means connected to receive the output signal of said oscillator, rectifier means connected to said reactor winding means for preventing unsaturative current flow therein during half cycles of a polarity tending to cause current flow in an undesirable unsaturating direction, a control winding for reducing the flux density of reactor below the saturation level during the non-conductive periods, and electrical circuit means for connecting the switching device to said winding means.

4. A control network, comprising a rectangular wave oscillator having an alternating output voltage, a self-saturating reactor connected in circuit with said oscillator, an electronic switching device, rectifier means connected in circuit with said reactor and said switching device to provide a unidirectional signal for turning on said switching device, a control winding connected to reduce the flux density of said reactor whereby a first portion of each half-cycle of the output voltage of said oscillator is required to saturate said reactor and said first portion is thereby reduced to a value which will turn off said switching device, and means connected in circuit with said switching device for applying a power signal to said switching device whereby a signal on said control winding modifies the effect of said power signal.

5. A control network, comprising a rectangular wave oscillator having an alternating output voltage, an electronic switching device adapted to be turned on by a unidirectional signal, a self-saturating reactor having saturating windings connected in circuit with said oscillator and said device, rectifier means connected in circuit with said oscillator, said device and said reactor to maintain unidirectional current flow in self-saturating windings of said reactor and to provide a unidirectional signal for turning on said switching device, a control winding adapted to have a unidirectional signal therein to reduce the flux density of said reactor whereby a first portion of each half-cycle of said output voltage is required to saturate said reactor and said first portion is thereby reduced to a value which will turn off said switching device, a load device connected in circuit with said switching device and means connected in circuit with said load device and said switching device for applying a power signal to said load device and said switching device whereby said unidirectional signal modifies the effect of said power signal on said load device.

6. A unidirectional voltage multiplier comprising a rectangular wave oscillator having an alternating output voltage, a full wave rectifier connected to said output voltage adapted to rectify said voltage to provide a unidirectional voltage $E_1$, self-saturating reactive impedance having load windings connected in circuit with said rectifier and said output voltage adapted to be saturated by each half cycle of said output voltage, said load windings being connected in circuit with said rectifiers so that said output voltage does not cause unsaturating current to flow therein, a reference signal $E_2$ connected to reference windings of said impedance to unsaturate said impedance whereby said each half cycle of said output wave must resaturate said impedance, a control signal $E_3$ connected on control windings of said impedance to partially counteract the effect of said reference signal $E_2$ so that only a portion of said output wave is required to resaturate said impedance, an electronic switching means adapted to be turned on by positive pulses of said voltage $E_1$, whenever said impedance is saturated, a load device, and electric circuit means for connecting said switching means and said load device serially across a power voltage $E_4$ whereby said load device is energized by an average voltage $E_5$ which is proportional to $E_3E_4$.

7. A multiplier comprising a rectangular wave oscillator having an integrated output voltage equal to zero, a full wave rectifier connected to said output voltage adapted to rectify said voltage to provide a unidirectional voltage $E_1$, self-saturating reactor impedance means having its load windings connected in circuit with said rectifier and said output voltage adapted to be saturated by each half cycle of said output voltage, said load windings being connected in circuit with said rectifiers in a sense whereby said output voltage does not cause unsaturating current to flow therein, a reference signal $E_2$ connected to reference windings on said impedance to unsaturate said impedance means whereby each half cycle of said output wave must resaturate said impedance means, a control signal $E_3$ connected on control windings of said impedance means to partially counteract the effect of said reference signal whereby only a portion of said output wave is required to resaturate said impedance means, an electronic switching means adapted to be turned on by positive pulses of said voltage $E_1$ whenever said impedance is saturated, a load device, said switching means and said load device being serially connected across a unidirectional power supply voltage $E_4$ whereby said load device is energized by an average voltage $E_5$ which is proportional to $E_3E_4$, and circuit means connected therewith to integrate said average voltage $E_5$ to prevent substantial fluctuations therein at a frequency proportional to that of said switching means.

8. A voltage regulator for a dynamoelectric machine comprising, a rectangular wave oscillator, having an alternating output voltage, a self-saturating magnetic amplifier connected in circuit with said output voltage, a control signal connected to said amplifier for reducing the flux density of said amplifier and thereby modifying the pulse width of each half cycle of said output voltage, a switching device, a full wave rectifier connected between said amplifier and said switching device whereby each half cycle of said output voltage provides a pulse in a sense to promote current flow in said switching device, and a field winding adapted to modify the flux excitation of the machine, said switching device connected in circuit with said field winding to control a voltage supplied to said field winding by allowing connection of said field winding across a voltage source only when said amplifier is saturated.

9. A voltage control network, comprising a rectangular wave oscillator having an alternating output voltage, an electronic switching device adapted to be turned on by a unidirectional signal, rectifier means connected in circuit with said oscillator and said switching device to rectify said output voltage to provide a unidirectional signal $E_1$ for turning on said switching device, a self-saturating reactor connected in circuit with said oscillator and said rectifier means, a unidirectional signal $E_2$ connected to said reactor to unsaturate said reactor whereby a first portion of each half cycle of said output voltage is required to saturate said reactor and said portion of each half cycle is thereby reduced to a value which will prevent current flow in said switching device, a load device connected in circuit with said switching device, means connected in circuit therewith for applying a unidirectional voltage $E_4$ to said load device and said switching device whereby said unidirectional signal $E_2$ modifies the effect of said unidirectional voltage $E_4$ on said device to provide an average voltage $E_5$ for energizing said load device and means connected to said load device for integrating the average voltage $E_5$ received by said load device.

10. A voltage regulator for a dynamoelectric machine comprising, a rectangular wave oscillator having an integrated output voltage equal to zero, a self-saturating magnetic amplifier having load windings connected in circuit with said output voltage, a control signal $E_2$ connected to windings on said amplifier for unsaturating said amplifier, a transistor adapted to be operated as a power switching device, a full wave rectifier connected in circuit with said amplifier and said transistor to prevent said output voltage from causing a current flow in said amplifier in a sense which will unsaturate it whereby each half cycle provides a pulse to turn on said transistor, said pulse having its width reduced in proportion to said control signal $E_2$, a field winding adapted to increase the flux excitation of the machine, voltage terminals on said machine, said transistor connected in circuit with said field winding and said voltage terminals to control voltage pulses supplied to said field winding by allowing connection of said field winding across said terminals only when said amplifier is saturated, and a rectifier connected across said field winding to integrate said voltage pulses and facilitate a substantially uniform unidirectional current flow in said field winding.

11. A regulator for limiting the current flow in a dynamoelectric machine, comprising a rectangular wave oscillator having an alternating output voltage, a self-saturating magnetic amplifier having load windings connected in circuit with said output voltage and adapted, when partially unsaturated, to reduce the pulse width of said wave, an electronic switching device, a full wave rectifier connecting said device to said amplifier whereby each half cycle of said output voltage provides a pulse to turn on said device, a field winding adapted to modify excitation of the machine, said device connected in circuit with said field winding to allow current flow thereto only when said pulse turns on said device, sensing means connected in circuit with the machine to provide a unidirectional signal proportional to the current flow in the machine, and circuit means connecting said unidirectional signal to said amplifier in a sense to unsaturate said amplifier and thereby reduce said pulse width to limit the excitation of the machine in a predetermined manner.

12. A regulator for limiting the current flow in a dynamoelectric machine, comprising a rectangular wave oscillator having an integrated output voltage equal to zero, a self-saturating magnetic amplifier connected in circuit with said output voltage and adapted to provide an unsaturated impedance which will reduce the pulse width of each half cycle of said output wave, a transistor adapted to be operated as a power switching device, a full wave rectifier connecting said transistor to said amplifier whereby each half cycle of said wave provides a pulse in a sense which enhances current flow through said transistor, a field winding adapted to excite the machine, said transistor connected in circuit with said field winding to allow current flow therethrough only when said amplifier is saturated, sensing means connected in circuit with the machine to provide a unidirectional signal proportional to the current flow in the machine, circuit means connecting said unidirectional signal to said amplifier in a sense to unsaturate said amplifier and thereby reduce said pulse width to limit the excitation of the machine in a predetermined manner.

13. A voltage regulating network for limiting the wattage of a dynamoelectric machine, comprising a rectangular wave oscillator having an alternating output voltage, a self-saturating magnetic amplifier having load windings connected in circuit with said output voltage and adapted to provide an unsaturated impedance which will reduce the pulse width of each half-cycle of said voltage, a reference winding on said amplifier energized in a sense to provide a flux which will unsaturate said amplifier during each half-cycle, thereby preventing any substantial current flow through said load windings, a control winding adapted to be energized in a sense which will counteract said flux produced by said reference winding whereby said amplifier will be saturated by said output voltage and pass during each half-cycle a pulse having a width proportional to the energization of said control winding, an electronic switch adapted to allow current flow therethrough when energized by a unidirectional pulse, rectifier means connected between said amplifier and said switch for providing said unidirectional pulse during each half-cycle when said control winding is energized, means connected in circuit with the machine adapted to reduce the excitation thereof, said switch and said means being serially connected across a terminal voltage of the machine to provide excitation of said means proportional to the voltage of the machine, a sensing means connected in circuit with the machine and adapted to provide a current signal proportional to a load current of the machine, and connections connecting said current signal from said sensing means to said control winding thereby to provide a pulse width proportional to said current signal whereby the excitation of said means is also proportional to said load current.

14. A voltage regulating network for limiting the wattage of a dynamoelectric machine, comprising a rectangular wave oscillator having an integrated output equal to zero, a self-saturating magnetic amplifier connected in circuit with said output voltage and adapted to modify the pulse width of each half-cycle of said output voltage, a reference winding of said amplifier energized in a sense to unsaturate said amplifier during each half-cycle thereby preventing any substantial current flow therethrough, a control winding adapted to be energized in a sense which will counteract flux produced by said reference winding whereby said amplifier will be saturated by said output voltage and pass a pulse during each half-cycle having a width proportional to the energization of said control winding, rectifier means connected to said amplifier for rectifying said pulse to provide a unidirectional pulse during each half-cycle when said control winding is energized, a transistor switch connected in circuit with said rectifier means and adapted to allow current flow therethrough when energized by said unidirectional pulse, an amplifying means connected to a field winding in the machine adapted to reduce the excitation thereof, said switch and said means being serially connected across the terminal voltage $E_4$ of the machine to provide a differential signal $E_5$ proportional to said voltage $E_4$ in said means, a sensing means connected in circuit with the machine and adapted to provide a signal $E_3$ proportional to a load current of the machine, and means connecting said signal $E_3$ to said control winding thereby to provide a pulse width proportional to said current signal $E_3$ whereby said differential signal $E_5$ is proportional to the product of said load current and said terminal voltage $E_4$.

15. A multiplying network for providing a signal proportional to the product of two voltages comprising, a rectangular wave oscillator developing an output voltage characterized by the absence of any substantial unidirectional components, a self-saturating magnetic amplifier having load windings connected in circuit with said output voltage and adapted to modify the pulse width of each half-cycle of said output voltage, a reference winding of said amplifier energized in a sense to unsaturate said amplifier during each half-cycle to thereby prevent any substantial current flow through said load windings, a control winding adapted to be energized by a first unidirectional control voltage $E_3$ in a sense which will counteract flux produced by said reference winding whereby said amplifier will be saturated by said output voltage and pass a pulse during each half-cycle having a width proportional to the energization of said control winding, an electronic switch connected in circuit with said rectifier means and adapted to allow current flow therethrough when energized by said pulse, said electronic switch being connected in circuit with a second control voltage $E_4$ in a sense to promote current flow through said electronic switch whereby a load connected in series with said switching device will sense an average voltage proportional to $E_3E_4$.

16. A multiplying network for providing a signal proportional to the product of two voltages comprising, a rectangular wave oscillator developing an output voltage characterized by the absence of any substantial unidirectional components, a self-saturating magnetic amplifier having load windings connected in circuit with said output voltage and adapted to modify the pulse width of each half-cycle of said output voltage, a reference winding of said amplifier energized in a sense to unsaturate said amplifier during each half-cycle to thereby prevent any substantial current flow through said load windings, a control winding adapted to be energized by a first unidirectional control voltage $E_3$ in a sense which will counteract flux produced by said reference winding whereby said amplifier will be saturated by said output voltage and pass a pulse during each half-cycle having a width proportional to the energization of said control winding, rectifier means connected to said amplifier for rectifying said pulse to provide unidirectional pulses during each half-cycle when said control winding is energized, a transistor connected in circuit with said rectifier means and adapted to allow current flow therethrough when energized by said unidirectional pulse, said transistor being connected in circuit with a second control voltage $E_4$ in a sense to promote current flow through said transistor whereby a load connected in series with said transistor will sense an average voltage proportional to $E_3E_4$.

17. A control network comprising, a rectangular wave oscillator developing an output voltage characterized by the absence of any substantial unidirectional component, rectifier means connected in circuit with said oscillator to rectify said output voltage to provide a unidirectional pulse signal during each half-cycle, an electronic switching device connected to have said unidirectional pulse signal promote conduction therethrough, a self-saturating reactor connected in circuit with said oscillator and said rectifier means, and a unidirectional signal winding on said reactor adapted to unsaturate said reactor whereby a first portion of each pulse is required to saturate said reactor and said first portion is thereby reduced to a value which will inhibit current flow in said switching device, whereby said unidirectional signal modifies the effect of said power supply.

18. A control network comprising: a rectangular wave oscillator developing an output voltage characterized by the absence of any substantial unidirectional component, rectifier means connected in circuit with said oscillator to rectify said output voltage to provide a unidirectional pulse signal during each half-cycle, a transistor connected to have said unidirectional pulse signal promote conduction therethrough, a self-saturating magnetic amplifier having load windings connected in circuit with said oscillator and said rectifier means, a unidirectional signal winding on said reactor adapted to be energized in a sense to unsaturate said reactor whereby a first portion of each pulse is required to saturate said reactor and said first portion is thereby reduced to a value which will inhibit current flow in said transistor, and means connected in circuit with said transistor for applying a power signal to a load device in a sense to promote current therethrough whereby said unidirectional signal modifies the effect of said power signal with respect to a load device.

19. A unidirectional electronic multiplier comprising a rectangular wave oscillator having an integrated output voltage equal to zero, said oscillator consisting of a saturable transformer and a pair of similar electronic switches connected to alternately connect a source of power to said transformer in a sense which will alternately saturate said transformer in a positive and a negative sense, connections providing a mutual reactive feedback from said transformer connected to alternately promote and inhibit current flow in each of said electronic switches respectively; a full wave rectifier connected to said output voltage adapted to rectify said voltage to provide a unidirectional voltage $E_1$; a self-saturating reactor impedance means having its load windings connected in circuit with said rectifier in a sense whereby said output voltage does not cause unsaturating current to flow therein, said impedance means adapted to be saturated by each half-cycle of said output voltage, a reference signal $E_2$ connected to reference windings on said impedance means to unsaturate said impedance whereby each half-cycle of said output wave must resaturate said impedance means, a control signal $E_3$ connected on control windings of said impedance to partially counteract the effect of said reference signal $E_2$ so that only a portion of said output voltage is required to resaturate said impedance means; an electronic switching means adapted to be turned on by positive pulses of said voltage $E_1$ whenever said impedance is saturated; a voltage $E_4$ connected to said switching means to form a series circuit whereby a load device connected across said series circuit is energized by an average voltage $E_5$ which is proportional to $E_3E_4$, and other circuit means connected therewith to integrate said average voltage $E_5$ to prevent substantial fluctuations thereof at a frequency proportional to that of said switching means.

20. A control network for regulating the terminal voltage, load current and wattage of a dynamoelectric machine comprising a rectangular wave oscillator having an integrated output voltage equal to zero, said oscillator consisting of a saturable transformer and a pair of similar electronic switches adapted to alternately connect a source of power to said transformer in a sense to alternately saturate said transformer in a positive and a negative direction, connections between said switches and switching windings on said transformer providing mutual reactive feedback from said transformer to alternately promote and inhibit current flow in each of said electronic switches respectively, a full wave rectifier connected to said output voltage adapted to rectify said voltage to provide a unidirectional voltage $E_1$; a self-saturating reactor impedance means having its load windings connected in circuit with said rectifier in a sense whereby said output voltage does not cause unsaturating current to flow therein; said impedance means adapted to be saturated by each half-cycle of said output voltage, reference windings on said impedance means adapted to be energized in a sense to unsaturate said impedance whereby each half-cycle of said output voltage must resaturate said impedance means, control windings of said impedance adapted to be energized by a control voltage $E_3$ in a sense to partially counteract the effect of said reference windings energization so that only a portion of said output voltage is required to resaturate said impedance means; an electronic switching connected in circuit with said rectifier to allow current flow therethrough when energized by a pulse having a width proportional to $E_3$, said switching means being connected to the terminal voltage $E_4$ to form a series circuit whereby a load device connected across said series circuit is energized by an average voltage $E_5$ which is proportional to $E_3E_4$, said load device being connected to the dynamoelectric machine in a sense which will reduce the excitation of the machine with an increase in $E_5$; sensing means connected to the load lines of the dynamoelectric machine for sensing the load current thereof, an impedance connected in circuit with said sensing means adapted to limit current flow from said sensing means, said impedance being of a greater value when said load current is less than a predetermined value than thereafter, connections between said load current sensing circuit and said control winding to control said pulse width by a current signal $E_3$; whereby said load device reduces the excitation of the dynamoelectric machine in proportion to $E_3$ and $E_4$ thereby controlling the wattage when $E_3$ is less than said predetermined value and the maximum current when $E_3$ is greater than said predetermined value, and connections between said control winding and the terminal voltage for providing another control signal proportional to the terminal voltage whenever the terminal voltage reaches a predetermined value thereby controlling the maximum terminal voltage of said dynamoelectric machine.

References Cited in the file of this patent

UNITED STATES PATENTS

| | | |
|---|---|---|
| 2,571,827 | Bradley | Oct. 16, 1951 |
| 2,579,336 | Rack | Dec. 18, 1951 |
| 2,620,448 | Wallace | Dec. 2, 1952 |
| 2,655,608 | Valdes | Oct. 13, 1953 |
| 2,773,233 | Marcks | Dec. 4, 1956 |
| 2,783,384 | Bright et al. | Feb. 26, 1957 |